United States Patent Office 2,988,779
Patented June 20, 1961

2,988,779
PLASTIC INJECTION SOLE MOLDING MACHINES
George Clefford Barton, Agoston Zoltan Kiss, and Harry Mellors, Leicester, England, assignors to United Shoe Machinery Corporation, Flemington, N.J., a corporation of New Jersey
Filed Apr. 17, 1959, Ser. No. 807,230
Claims priority, application Great Britain May 17, 1958
2 Claims. (Cl. 18—30)

This invention relates to plastic injection molding machines, and is herein illustrated in its application to machines of this type adapted to mold outsoles onto the bottoms of lasted shoes. Such a machine is illustrated and described in an application for United States Letters Patent Serial No. 766,105, filed October 8, 1958, in the names of George C. Barton and Robert C. Quarmby.

In the operation of machines of this type a small plug of plastic residue is formed in the region of the valve connecting the plastic injection nozzle to the mold cavity. This residue must be removed after each operation of the machine. It is an object of the present invention to provide a convenient and reliable means for removing the residue after each operation of the machine to insure the clearance of the valve port and adjacent passages between the valve port and the injection nozzle preparatory to the next succeeding operation of the machine.

With the above object in view the present invention in one aspect thereof contemplates the provision in a plastic injection molding machine having an injection nozzle and a sprue member having an injection passage communicating with a mold cavity of a sliding valve member and a member providing a portion of a socket for receiving the nozzle. The sliding valve member is positioned between the sprue member and the socket member and provides a port which, in one position of the valve member, closes the ingress end of the sprue member and in the other position thereof provides a communication between the socket member and the sprue member. For removing residue from the socket and also from the port in the sliding valve member, an ejector lever is fulcrumed in the socket member. Said ejector lever is constructed and arranged to complete the socket structure and is characterized by the provision therein of a secondary passage which connects the socket and the valve port when the valve is in its closed position. Said secondary passage causes the occurrence of a connecting link between the residue in the valve port and the residue in the socket. Thus, the residue left in the valve port when the valve member moves into its closed position forms a unitary structure with the residue in the socket and consequently the operation of the ejector lever clears not only the socket but also the valve port and prepares both passages for the next succeeding injection cycle of the machine.

It is a further object of the invention to provide a simple organization which will operate reliably, upon the completion of the filling of the cavity, to move the valve member into its closed position thus to obviate any undesirable increase in pressure in the mold cavity after the cavity is filled. With this object in view the present invention in another aspect thereof contemplates the provision with the sliding valve member, of means for moving the valve member into a position in which it closes the passage in the sprue member. A microswitch is provided for causing the operation of the valve moving means, and means responsive to pressure in the mold cavity operates the microswitch. In the illustrated organization the valve member is moved into its closed position by a spring and a suitable latch is provided for holding the valve member in its open position. A booster is provided for augmenting the action of the spring to advance the valve member into its closed position, the illustrated booster being held in its retracted position by the latch above referred to. The latch is released by the operation of a solenoid which is operated by a microswitch, the microswitch in turn being operated by means responsive to pressure in the mold cavity.

These and other features of the invention will now be described with relation to the accompanying drawings and pointed out in the appended claims.

In the drawings,

FIG. 1 illustrates the forepart of a lasted shoe in side elevation with relation to portions of the mold elements and control mechanisms of a plastic injection sole molding machine of the type illustrated in the application for United States Letters Patent hereinbefore referred to, portions of the control mechanisms and other parts being shown in section on the longitudinal median line of the shoe;

Figure 1:
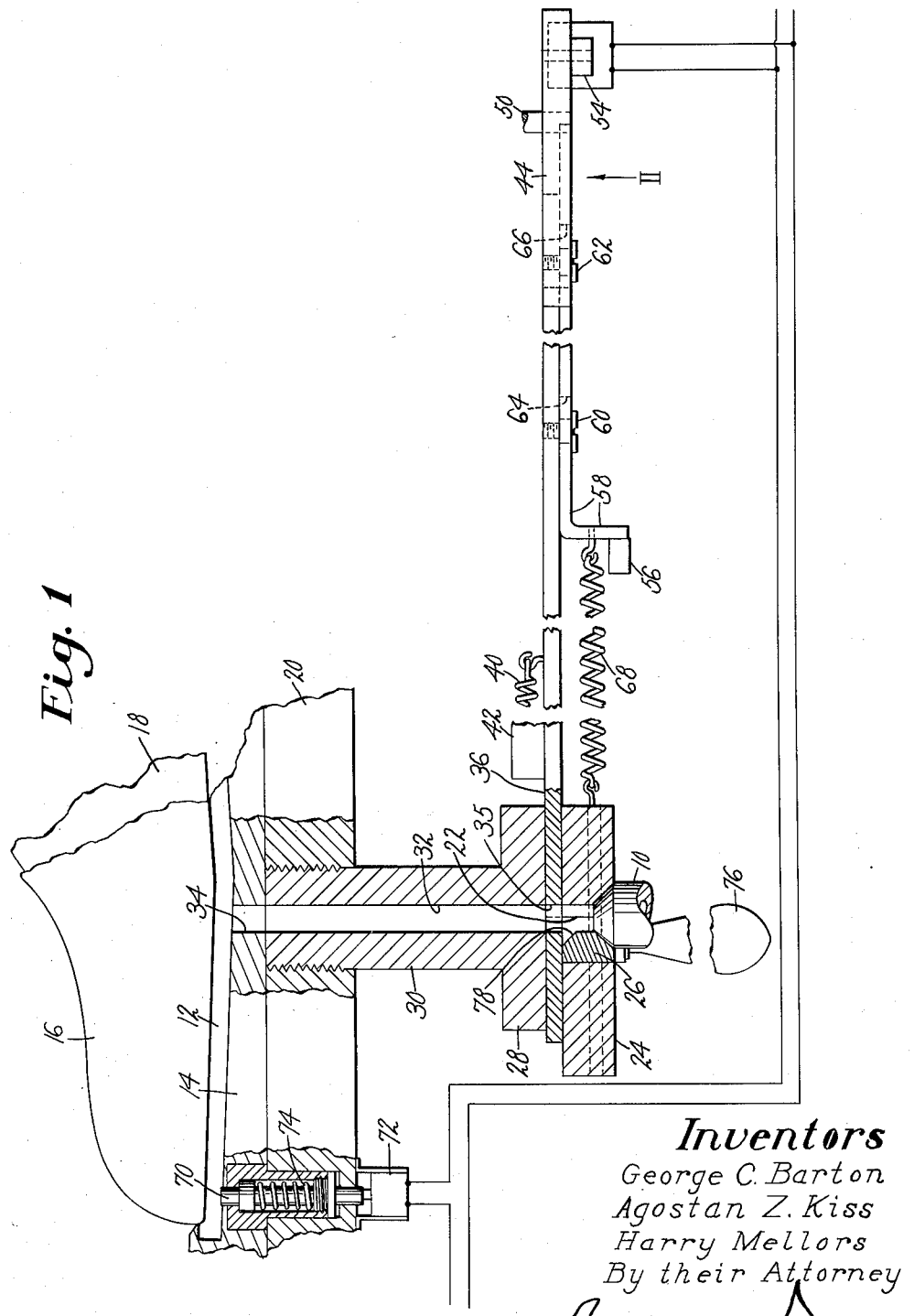
Figure 3:
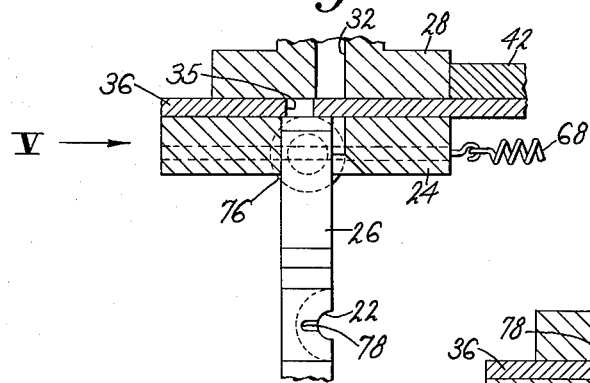
FIG. 3 is a sectional view taken on the same plane as FIG. 1 illustrating certain mechanisms in a position different from their position in FIG. 1.
Figure 5:
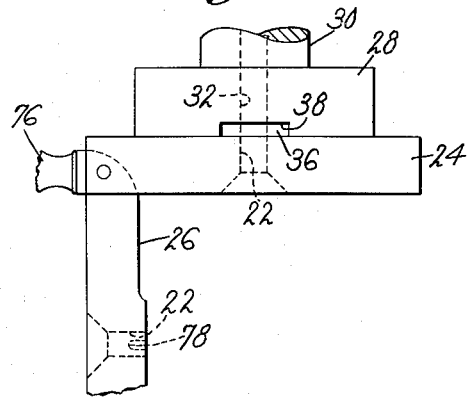
FIG. 5 illustrates the parts shown in FIGS. 3 and 4 in an elevation indicated by the arrow V applied to FIG. 3.

The invention as herein illustrated is embodied in a plastic injection sole molding machine which, in its general organization, is substantially similar to the machine illustrated in the application of Barton and Quarmby hereinbefore referred to. Machines of this type are provided with a power operated piston for forcing plastic material in fluid form through a heated cylinder (not shown) and from the cylinder through a nozzle such, for example, as the nozzle 10 illustrated in FIG. 1. From the nozzle the fluid plastic passes through members hereinafter described into a mold cavity 12 defined by a pair of side mold members (not shown), a bottom mold member 14, and a lasted shoe 16 mounted on a shoe form 18 incorporated in the machine, the shoe, when positioned in the molding station, forming the closure for the top of the mold cavity. The side mold members and the bottom mold member are mounted in a mold box, a portion of which is shown in FIG. 1 and identified by the numeral 20. The machine illustrated and described in the application for United States Letters Patent above referred to is provided with a plurality of mold boxes each containing the mold elements above described, said boxes being mounted on a turret (not shown) which is rotated step by step on a vertical axis to advance the mold assemblies successively to and from an injection station in which they are successively presented to the nozzle 10. It will be understood that before a given mold organization is presented to the nozzle the side mold members are moved toward each other into their closed positions, the bottom mold member 14 is moved upwardly into its position illustrated in FIG. 1, and the shoe form 18, with a lasted shoe 16 mounted thereon, is advanced into its position illustrated in FIG. 1 to complete the closure of the mold cavity. The patent application above referred to discloses suitable means for rotating the turret step by step and for positioning each mold box successively in the injection station in accurate registration with the nozzle 10. In this position the nozzle is in alinement with a port 22 half of which is formed in a nozzle receiving plate 24 and the other half in a lever 26 which is movable manually from its position of registration with the plate 24 illustrated in FIG. 1 into its retracted position illustrated in FIGS. 3 and 5. The outer portion of the port 22 is countersunk, as shown in FIG. 1, to receive the frusto-conical end portion of the nozzle 10. The plate 24 is secured to a crosshead 28 at the outer extremity of a sprue member 30 mounted in the box 20. The sprue member has a central bore 32 which communicates with an injection port 34 formed in the bottom mold member 14. At its opposite end the bore 32 communicates through a port 35 in a gate valve hereinafter described with the bore 22. The illustrated gate valve is a relatively narrow elongate plate 36 mounted for sliding movement in a passageway provided by a groove 38 (FIG. 5) formed in the crosshead 28 and the proximate surface of the plate 24. In its open position illustrated in FIG. 1 the gate valve provides a continuous passage from the nozzle 10 to the mold cavity, and in its position illustrated in FIG. 3 the gate valve closes the passage and prevents the flow of plastic into the mold cavity. The plate 36 of the gate valve extends to the right, as seen in FIG. 1, and is urged by a spring 40 to the left into its closed position illustrated in FIG. 3, this position being determined by the engagement of a block 42, fixed to the plate 36, with the right end face of the crosshead 28.

Figure 2:
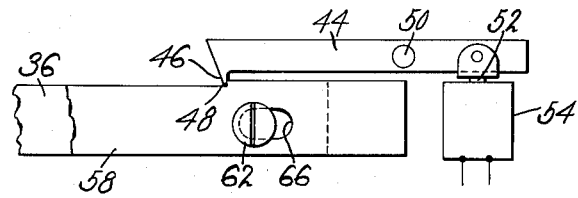
FIG. 2 is a detail view illustrating features of the control mechanism and taken in the direction of the arrow II in FIG. 1.

During the plastic injecting operation the gate valve is latched in its open position illustrated in FIG. 1 by a pawl 44 (FIG. 2) having a tooth 46 constructed and arranged to engage a shoulder 48 formed in the right end portion of the sliding plate 36. The pawl 44 is pivotally mounted on a vertical axis provided by a fixed pin 50 and is urged into latching engagement with the plate 36 by a light spring (not shown). As shown in FIG. 2, the pawl 44 extends to the right beyond the pin 50 and has pivotally mounted thereon the armature 52 of a solenoid 54. In the operation of the machine the solenoid is energized to unlatch the pawl 44 from the plate 36, leaving the plate free to be moved to the left by the spring 40 into its position illustrated in FIG. 3 in which the gate valve is closed and access from the nozzle 10 to the mold cavity is cut off. For returning the gate valve to its open position illustrated in FIG. 1, the illustrated organization includes a lever 56 constructed and arranged to act against the angular end portion of a plate 58 having a pin-and-slot connection to the plate 36 provided by two headed screws 60 and 62 mounted in the plate 36 and extending through longitudinal slots 64 and 66 formed in the plate 58. A spring 68 anchored at one end to the plate 58 and at the other end to the plate 24 serves as a booster mechanism for advancing the plate 36 into its position illustrated in FIG. 3 in the event that the spring 40 fails to overcome the influence of friction on the plate 36. It will be understood that the initial movement of the plate 58 by the lever 56 takes up the lost motion provided by the slots 64 and 66 and further movement advances the valve plate 36 into its position illustrated in FIG. 1 in which the nozzle 10 is in communication with the mold cavity. In this position both the valve plate 36 and the plate 58 are latched in their position illustrated in FIG. 1 by the pawl 44. When the solenoid 54 is energized, the pawl 44 is disengaged from the plate 36 and from the plate 58, whereupon the spring 40, aided by the spring 68 as required, advances the valve plate 36 into its position illustrated in FIG. 3, thus closing the valve.

For causing the solenoid 54 to be energized, a spring plunger 70 is mounted in the mold box 20 so that one end extends through a suitable bore into the mold cavity. The other end of the plunger is arranged to engage a microswith 72. When the mold cavity has been completely filled with fluid plastic and sufficient pressure of the fluid plastic has been built up in the mold cavity to overcome the pressure of a spring 74 which normally holds the plunger in its position illustrated in FIG. 1, the microswitch is operated to close an electrical circuit to the solenoid. The operation of the microswitch 72 also opens a relay circuit to an electromagnetic clutch (not shown) which controls the operation of the plastic injecting piston. It will be understood that the provision of means for closing the gate valve immediately upon the completion of the filling of the mold cavity obviates any excessive increase of pressure within the mold cavity such, for example, as the pressure resulting from movement of the injection piston under its own momentum after the application of power thereto has been terminated. The pressure increase caused by such movement of the injection piston occurs in the injection cylinder only and not in the mold cavity.

Figure 4:
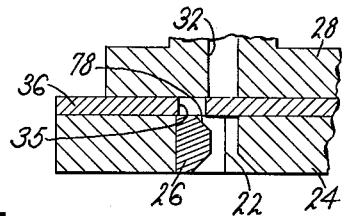
FIG. 4 is a sectional view similar to FIG. 3 showing said mechanisms in still another position.

To facilitate the removal from the gate valve 36 and from the port 22 of the plastic which sets therein after the closing of the gate valve, the lever 26 is operable as a clearing or ejecting means. To this end the lever is provided with a handle 76 to facilitate manual angular movement of the lever from its position in FIG. 1 into its position illustrated in FIGS. 3 and 5. In order to insure the removal of plastic residue from the gate valve by the operation of the clearing lever 26 the clearing lever has formed therein a bevel 78 (FIG. 4) which provides a passage between the port 22 and the port in the gate valve when the valve is in its closed position. With this arrangement the residue in the port 35 of the gate valve is physically connected to the residue in the port 22 and consequently such residue will be cleared from the gate valve together with the residue in the port 22 by the operation of the clearing lever 26.

Having thus described our invention, what we claim as new and desire to secure by Letters Patent of the United States is:

1. In a plastic injection molding machine the combination with an injection nozzle, of a member providing a portion of a socket for receiving the nozzle, an ejector lever fulcrumed in the member and constructed and arranged to complete the socket, a sprue member providing a passage communicating with a mold cavity, a sliding valve member between the sprue member and the socket member having a port which in one position of the sliding valve member provides a communication between the socket and the passage, said ejector lever being characterized by the formation therein of a secondary passage connecting the valve port and the socket when the sliding valve member is in its closed position, and means for moving the ejector lever relatively to the socket providing member thereby to remove plastic residue not only from the socket providing member but also from the port in the sliding valve member.

2. In a plastic injection molding machine the combination with an injection nozzle, of a member providing a socket for receiving the nozzle, a sprue member providing a passage communicating with a mold cavity, a sliding valve member between the sprue member and the socket member having a port which, in one position thereof, communicates with the passage in the sprue member, a spring for moving the valve member into a position in which it closes the passage in the sprue member, a latch for holding the valve member in a position in which the port therein communicates with the passage in the sprue member, a booster constructed and arranged to be held in retracted position by the latch, a solenoid for releasing the latch to permit the valve member to be advanced by the action of the spring augmented by the action of the booster, a microswitch for activating the solenoid, and means responsive to pressure in the mold cavity for operating the microswitch.

References Cited in the file of this patent

UNITED STATES PATENTS

| | | |
|---|---|---|
| 1,674,387 | Campbell | June 19, 1928 |
| 2,415,961 | Nast | Feb. 18, 1947 |
| 2,585,204 | Wondra | Feb. 12, 1952 |